(12) United States Patent
Holguin et al.

(10) Patent No.: US 6,703,463 B2
(45) Date of Patent: Mar. 9, 2004

(54) OPTICAL ADHESIVE COATING HAVING LOW REFRACTIVE INDEX

(75) Inventors: Daniel Holguin, Fullerton, CA (US); Eng Pi Chang, Arcadia, CA (US)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 10/102,157

(22) Filed: Mar. 19, 2002

(65) Prior Publication Data

US 2003/0104200 A1 Jun. 5, 2003

Related U.S. Application Data

(60) Provisional application No. 60/336,288, filed on Oct. 25, 2001, and provisional application No. 60/309,317, filed on Aug. 1, 2001.

(51) Int. Cl.[7] .............................................. C08F 114/18
(52) U.S. Cl. ........................ 526/245; 428/421; 428/422
(58) Field of Search .......................... 526/245; 428/421, 428/422

(56) References Cited

U.S. PATENT DOCUMENTS

| | | | |
|---|---|---|---|
| 3,879,430 A | 4/1975 | O'Rear et al. | 260/348 |
| 4,504,642 A | 3/1985 | Ohmori et al. | 526/246 |
| 4,544,235 A | 10/1985 | Nishida et al. | 350/96.34 |
| 4,557,562 A | 12/1985 | Ohmori et al. | 350/96.34 |
| 4,660,923 A | 4/1987 | Ohmori | 350/96.34 |
| 4,786,552 A | 11/1988 | Sasaki et al. | 428/355 |
| 4,786,658 A | 11/1988 | Hashimoto et al. | 522/121 |
| 4,804,246 A | 2/1989 | Kobayashi et al. | 350/96.34 |
| 4,914,171 A | 4/1990 | Zweig | 526/246 |
| 4,971,424 A | 11/1990 | Babirad et al. | 350/96.34 |
| 5,024,507 A | 6/1991 | Minns et al. | 350/96.34 |
| 5,059,451 A | 10/1991 | Agou et al. | 427/164 |
| 5,468,812 A | 11/1995 | Muggli et al. | 525/293 |
| 5,492,987 A | 2/1996 | Minns | 526/245 |
| 5,690,863 A | 11/1997 | Schuman | 252/582 |
| 5,882,773 A | 3/1999 | Chow et al. | 428/212 |
| 5,965,256 A | 10/1999 | Barrera | 428/354 |
| 6,064,524 A | 5/2000 | Oka et al. | 359/582 |

OTHER PUBLICATIONS

Zonyl® Fluorochemical Intermediates, DuPont Performance Chemicals, Sep. 1998.

*Primary Examiner*—Bernard Lipman
(74) *Attorney, Agent, or Firm*—Renner, Otto, Boisselle & Sklar, LLP

(57) ABSTRACT

This invention is directed to optical adhesives useful in light transmitting devices, and more particularly to fluorosubstituted monoacrylate based adhesives having low refractive index. The optical adhesive of the present invention is soluble in organic solvents, and in particular, in non-fluorinated organic solvents. The polymer of the optical adhesive of the present invention has a low glass transition temperature and has the ability to bond well with substrates, including glass substrates and polyethylene terephthalate polyester film substrates typically used in optical devices. The invention is further directed to transfer tapes comprised of at least one layer of a fluorosubstituted monoacrylate based adhesive.

30 Claims, No Drawings

OPTICAL ADHESIVE COATING HAVING LOW REFRACTIVE INDEX

RELATED APPLICATIONS

This application claims priority under 35 U.S.C. §119(e) to U.S. Provisional Application No. 60/336,288 filed on Oct. 25, 2001 and U.S. Provisional Application No. 60/309,317 filed on Aug. 1, 2001.

FIELD OF THE INVENTION

This invention is directed to optical adhesives useful in light transmitting devices, and more particularly to fluoro-substituted monoacrylate based adhesives having low refractive index. The invention is further directed to transfer tapes comprised of at least one layer of a fluorosubstituted monoacrylate based adhesive.

BACKGROUND OF THE INVENTION

Optical coatings to control light distribution, i.e., anti-glare, anti-iridescence, low reflectance and interference, employ coatings of varying refractive index to obtain the desired light distribution. While fluoropolymers offer low refractive index, generally below 1.4, fluoropolymers typically have poor solvent solubility and poor adhesion to substrates.

For optical applications, fluoropolymers are usually made in situ by radiation curing. Alternatively, fluoropolymers may be extruded as melts. It is desirable, therefore, to provide a solvent-soluble fluoropolymer having low refractive index and good adhesion to substrates.

SUMMARY OF THE INVENTION

The present invention is directed to an optical adhesive having a refractive index of less than 1.40 comprising a transparent polymer comprising:

75–100% by weight, based on the total weight of the polymer of at least one fluorosubstituted monoacrylate comonomer of the formula:

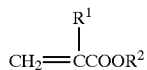

(I)

wherein $R^1$ is hydrogen and $R^2$ is a linear or branched fluoroalkyl group having 2 to 20 carbon atoms; and 0–5% by weight, based on the total weight of the polymer of an ethylenically unsaturated comonomer selected from the group consisting of (a) mono- and di-carboxylic acids, (b) hydroxyalkyl monomers, (c) epoxy monomers, (d) carboxylic amides, and (e) N-vinyl lactam monomers. The optical adhesive of the present invention is soluble in organic solvents, and in particular, in non-fluorinated organic solvents. The polymer of the optical adhesive of the present invention has a low glass transition temperature and has the ability to bond well with substrates, including glass substrates and polyethylene terephthalate polyester film substrates typically used in optical devices.

The present invention is further directed to a transfer tape comprising an optical adhesive layer and a carrier layer, wherein the optical adhesive has a refractive index of less than 1.40 and comprises a transparent polymer comprising:

75–100% by weight, based on the total weight of the polymer of at least one fluorosubstituted monoacrylate comonomer of the formula:

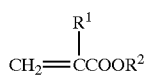

(I)

wherein $R^1$ is hydrogen and $R^2$ is a linear or branched fluoroalkyl group having 2 to 20 carbon atoms; and 0–5% by weight, based on the total weight of the polymer of an ethylenically unsaturated comonomer selected from the group consisting of (a) mono- and di-carboxylic acids, (b) hydroxyalkyl monomers, (c) epoxy monomers, (d) carboxylic amides, and (e) N-vinyl lactam monomers.

DETAILED DESCRIPTION OF THE INVENTION

The fluorosubstituted acrylates of the present invention can be copolymerized to prepare copolymers having specifically desired physical properties, such as refractive index, glass transition temperature, light transmittance and adhesiveness.

The fluorosubstituted acrylate monomers used to form the polymer of the present invention are selected from monoacrylates. Generally, monoacrylates are preferred over monomethacrylates because of their lower refractive indices. Among the monoacrylates that may be used are, for example, those of the formula:

(I)

wherein $R^1$ is hydrogen and $R^2$ is a linear or branched fluoroalkyl group. In one embodiment, the fluoroalkyl group $R^2$ is a fluoroalkyl having 2 to 20 carbon atoms. For example, the fluoroalkyl group may be one of: $-CH_2CF_3$, $-CH_2C_2F_5$, $-CH_2C_3F_7$, $-CH_2C_4F_9$, $-CH_2C_5F_{11}$, $-CH_2C_7F_{15}$, $-CH_2C_8F_{17}$, $-CH_2C_9F_{19}$, $-CH_2C_{10}F_{21}$, $-CH_2CH_2CF_3$, $-CH_2CH_2C_2F_5$, $-CH_2CH_2C_3F_7$, $-CH_2CH_2C_4F_9$, $-CH_2CH_2C_5F_{11}$, $-CH_2CH_2C_7F_{15}$, $-CH_2CH_2C_8F_{17}$, $-CH_2CH_2C_9F_{18}$, $-CH_2CH_2C_{10}F_{21}$, $-CH_2(CF_2)_2H$, $-CH_2(CF_2)_4H$, $-CH_2(CF_2)_6H$, $-CH_2(CF_2)_8H$, $-CH_2(CF_2)_{10}H$, $-CH(CF_3)_2$, $-CH_2CF_2CHFCF_3$, $-CH_2CF_2CHF(CF_2)_6H$, $-CH_2CF(CF_3)CHFCF(CF_3)_2$, $-CH_2C_6HF_{12}$, $-C_6HF_{12}$, $-CH_2C_{10}HF_{20}$, $-CH_2C_5F_9H$,

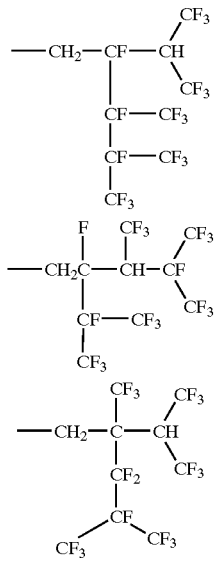

Particularly useful fluorosubstituted monoacrylates include 1H,1H-heptafluorobutyl acrylate, 1H,1H-pentadecafluorooctyl acrylate, hexafluoroisopropylacrylate, 2,2,2-trifluoroethyl acrylate and 1H,1H,2H,2H-heptadecafluorodecyl acrylate. Another useful fluorosubstituted monoacrylate is a blend of 1H,1H,2H,2H-fluoroalkyl acrylates available from DuPont under the tradename ZONYL® TA-N.

The fluoropolymer used to make the optical adhesive of the present invention generally contains 75–100% by weight, based on the total weight of the polymer, of fluorosubstituted monoacrylate. In one embodiment, the polymer comprises two fluorosubstituted monoacrylates, wherein the total fluorosubstituted monoacrylate content is within the range of 75–100% by weight, based on the total weight of the polymer.

In another embodiment of the present invention, the polymer comprises 95–100% by weight, based on the total weight of the polymer, of the fluorosubstituted monoacrylate. In yet another embodiment of the present invention, the polymer comprises 99–100% by weight, based on the total weight of the polymer, of the fluorosubstituted monoacrylate.

Fluorosubstituted methacrylates may be substituted for a portion of the fluorosubstituted acrylates described above. Examples of such fluorosubstituted methacrylates include methacrylates of Formula I above, wherein $R^1$ is methyl, or a fluorosubstituted methyl group. Because the fluorosubstituted methacrylates generally have higher refractive index and glass transition temperature than the fluorosubstituted acrylates, only a relatively small amount of the methacrylate is included in the polymer of the optical adhesive of the present invention.

A small amount of fluorosubstituted diacrylate monomer may be added to the fluorosubstituted monoacrylate monomer. The addition of an excessive amount of fluorosubstituted diacrylate, greater than about 1% by weight, causes gelling of the optical adhesive.

In addition to the fluorosubstituted monoacrylate monomer, the adhesive polymer contains at least one ethylenically unsaturated monomer having a polar group. This ethylenically unsaturated monomer enhances the cohesive strength of the adhesive and provides a site for crosslinking. Useful ethylenically unsaturated polar monomers include ethylenically unsaturated mono-, di- and polycarboxylic acids, epoxy monomers, hydroxyalkyl monomers, carboxylic amides, and N-vinyl lactam monomers. The fluoropolymer used to make the optical adhesive of the present invention generally contains up to 5% by weight, based on the total weight of the polymer, of the ethylenically unsaturated polar monomer. In one embodiment, the fluoropolymer contains up to 2% by weight, based on the total weight of the polymer, of the ethylenically unsaturated polar monomer, and in another embodiment, the fluoropolymer contains up to 0.5% by weight, based on the total weight of the polymer, of the ethylenically unsaturated polar monomer.

Useful ethylenically unsaturated mono- and dicarboxylic acids include acrylic acid, methacrylic acid, crotonic acid, maleic acid, fumaric acid, itaconic acid, glutaconic acid, 3-methylglutaconic acid, muconic acid, dihydromuconic acid, methylenemalonic acid, citraconic acid, mesaconic acid, and methyleneglutaric acid. Acrylic acid is particularly useful as the ethylenically unsaturated polar monomer.

Useful ethylenically unsaturated epoxy monomers include glycidyl methacrylate, methylglycidyl methacrylate and allylglycidylether. The ethylenically unsaturated carboxylic amides include N-alkylcarboxylic amides, N-methylol carboxylic amides, and alkylethers of the foregoing amides, for example, acrylamide, methacrylamide, N-methylacrylamide, β-diethylacrylamide, mono-, di- and ester-amides of maleic, fumaric, itaconic and other ethylenically unsaturated dicarboxylic acids, N-methylol acrylamide, N-methylol methacrylamide, and ethers of the foregoing N-methylol amide.

Useful ethylenically unsaturated hydroxyalkyl monomers include 2-hydroxyethyl acrylate, 2-hydroxyethyl methacrylate, hydroxypropyl acrylate, hydroxypropyl methacrylate, hydroxybutyl acrylate and hydroxybutyl methacrylate.

Useful N-vinyl lactam monomers include such monomers as N-vinyl pyrrolidone.

In one embodiment, a fluorosubstituted alpha, beta-ethylenically unsaturated dicarboxylic acid may be used. Useful fluorosubstituted alpha,beta-ethylenically unsaturated dicarboxylic acids include bis(1H,1H-pentadecafluorooctyl) fumarate, bis(1H,1H-heptafluorobutyl) fumarate, and mixtures thereof. The fluoropolymer used to make the adhesive of the present invention may contain up to 25% by weight, based on the total weight of the polymer, of the fluorosubstituted alpha, beta-ethylenically unsaturated dicarboxylic acid. U.S. Pat. No. 4,786,658, incorporated by reference herein, describes the use of fumarates in fluorinated polymers.

In one embodiment, a fluoroalkyl ethylene comonomer is polymerized with the fluorosubstituted monoacrylate monomer for the optical polymer. Useful fluoroalkyl ethylenes include perfluorobutyl ethylene, $F(CF_2CF_2)_2CH_2=CH_2$.

The fluoroalkyl ethylene, as well as the fluorosubstituted alpha, beta-ethylenically unsaturated dicarboxylic acid described above are particularly useful when the polymer of the present invention is made by a bulk polymerization process. The utility of bis(1H,1H-heptafluorobutyl) fumarate and perfluorobutyl ethylene in bulk polymerization process is that they do not readily homopolymerize, but do copolymerize well with acrylic monomers. The bis(1H,1H-heptafluorobutyl) fumarate and perfluorobutyl ethylene function like a solvent to dissipate the heat of polymerization from the reaction initially. When the initial reactor charge (mixture of monomers and initiator) begins to react, the heat of polymerization must be dissipated to avoid gellation. This is known as the Trommsdorf Effect.

A non-fluorosubstituted monoacrylate monomer having a low glass transition temperature (Tg) may be added to the fluorosubstituted monoacrylate monomer to enhance the adhesive properties of the adhesive. A low Tg monomer, as defined herein, is a monomer wherein its homopolymer has a glass transition temperature of or below 10° C. Such monoacrylate monomers include 2-ethylhexyl acrylate, isooctyl acrylate, butyl acrylate, ethyl acrylate, methyl acrylate, and mixtures thereof. The optical adhesive of the present invention may contain up to 5% by weight, based on the total weight of the polymer, of the low Tg non-fluorosubstituted monoacrylate monomer.

The polymer of the present invention has a glass transition temperature (Tg) of at least 10° C. below the use temperature. The "use" temperature is the temperature at which the adhesive in normally bonded to a substrate. In one embodiment, the polymer has a glass transition temperature of less than 15° C., as determined by differential scanning calorimeter (DSC). In another embodiment, the polymer has a glass transition temperature of less than 0° C., as determined by differential scanning calorimeter (DSC).

In one embodiment, the polymers are synthesized by conventional free radical techniques in solution, using a solvent such as ethyl acetate. Bulk polymerization, such as that described in U.S. Pat. No. 4,786,552, incorporated by reference herein, may also be used. For monomer systems of low acid content, suspension and emulsion polymerization may also be used. Polymerization of the fluorosubstituted monoacrylates may be initiated by a variety of well known free radical initiators. Useful initiators include compounds such as azobisisobutyronitrile, azobis(2-cyanovaleric acid), and 2,2'-azobis(2-methylbutyronitrile), and the like, and organic peroxides such as cumene hydroperoxide, t-butyl peroxide, t-amyl hydroperoxide, t-butyl perbenzoate, di-tbutyl peroxy phthalate, benzoyl peroxide and lauryl peroxide.

Chemical cross-linkers provided in an amount of up to 2.0% by weight in one embodiment, and in an amount of up to 0.5% by weight in another embodiment, can be used to increase the cohesive strength of the polymer. Aluminum acetyl acetonate (AAA) is a particularly useful chemical crosslinking agent.

In one embodiment, an amorphous fluoropolymer, such as Teflon AF® commercially available from E. I. duPont de Nemours, is added to the adhesive composition. Teflon AF® amorphous fluoropolymer has a low refractive index, within the range of 1.29–1.31.

The fluorosubstituted polymer of the adhesive is soluble in an organic solvent, and it may be dissolved in a solvent to obtain a coating composition for application directly to the optical element or onto to a transfer or carrier film or a release liner. A fluorine-containing solvent is not required for adhesive solubility. The solvent used for this purpose includes a ketone such as methyl ethyl ketone or methyl isobutyl ketone, an ester such as ethyl acetate or butyl acetate, an aromatic compound such as toluene or xylene and an aliphatic hydrocarbon compound such as octane or hexane. These solvents may suitably be used in combination. Solvent solubility is indicated by a clear or slightly hazy solution of the polymer in the solvent, with substantially no gel or precipitation.

In one embodiment of the invention, the adhesives are cured by exposure to heat under drying conditions, i.e., the adhesives are cured at elevated temperatures sufficient to evaporate solvent(s) from the composition. Such temperatures typically range from about 70° C. to about 120° C.

In another embodiment of the invention, the adhesives are radiation cured. Curing of the adhesive compositions of the present invention can be effected by passing the adhesive-coated substrate through radiation equipment that is designed to provide the coated substrate with sufficient residence time to complete the cure of the coating. Curing may be effected in an air atmosphere or in an inert atmosphere such as nitrogen or argon. An inert atmosphere is preferred. The length of exposure necessary to cure the adhesive compositions of the present invention varies with such factors as the particular formulation used, type and wavelength of radiation, dose rate, energy flux, concentration of photoinitiator (when required), the atmosphere and thickness of the coating.

In the present invention, a thickness of from 0.5 $\mu$m to 500 $\mu$m (dry basis) is sufficient for the adhesive coating. In one embodiment, the thickness of the adhesive is within the range of 5 $\mu$m to 300 $\mu$m, and in another embodiment, the thickness of the adhesive is within the range of 10 $\mu$m to 50 $\mu$m.

The optical adhesive of the present invention may be a pressure sensitive adhesive. Alternatively, the optical adhesive may be a heat activated adhesive.

In addition to the adhesive compositions described above, the present invention further provides both a transfer tape and tapes of layered construction, the latter consisting of a core coated on one or both sides with a skin layer comprised of the optical adhesive of the present invention.

Transfer tapes prepared in accordance with the present invention comprise a film of adhesive as described above, and at least one release liner. Thus, the adhesives may be coated on a release liner, such as a silicone or carbamate release coated plastic film or paper. Alternatively, a tape of layered construction can be prepared by coating a core, such as a polyester film, on one or both sides with a "skin layer" of fluorosubstituted monoacrylate based pressure-sensitive adhesive of the type described above. The core may be an adhesive of the present invention with a release liner applied to each side of the adhesive to form a "sandwich" arrangement.

The specific examples presented below will serve to more fully describe how the present invention can be practically used. However, it should be understood that the examples are only illustrative and in no way limit the scope of the present invention.

EXAMPLES

Example 1

Into a 100 ml reactor equipped with a nitrogen purge, an agitator and a reflux condenser was added 20 grams of ethyl acetate. The reactor contents were heated to reflux with a jacket at 85° C. A monomer mixture of 44.0 grams 1H,1H-pentadecafluorooctyl acrylate, 5.0 grams of 2,2-trifluoroethyl acrylate, 1.0 grams of acrylic acid and 0.084 grams of 2,2'-azobis(2-methylbutyronitrile) (an initiator commercially available as Vazo 67 from E. I. DuPont de Nemours) was slowly added to the reactor over a period of 2 hours. After the reactor contents were allowed to react 1 hour, 1.7 grams of ethyl acetate and 0.05 grams of Vazo 67 initiator were added to the reactor. The reactor contents were allowed to react for 1 hour before a second portion of 1.7 grams of ethyl acetate and 0.05 grams of Vazo 67 initiator were added to the reactor. An additional 1.7 grams of ethyl acetate and 0.05 grams of Vazo 67 initiator were added to the reactor after the reactor contents were again permitted to react for 1 hour. After the addition of the third portion of initiator, the reactor contents were held for an additional hour, and then cooled. The percentage solids at the end of reaction was 73.9%. The resulting polymer consisted of 88% by weight 1H,1H-pentadecafluorooctyl acrylate, 10% by weight 2,2-trifluoroethyl acetate, and 2% by weight of acrylic acid, based on the total weight of the polymer. The polymer in solvent appeared slightly hazy with no gel or precipitation present.

Examples 2–18

Examples 2–18 were prepared substantially in accordance with the procedure of Example 1 with the exception that the monomer mixture was altered as indicated in Table 1 below. All values listed for the monomers are weigh percentages, based on the total weight of the polymer. Also listed in Table 1 is the percent fluorine atom content for each of the polymers, based on the total weight of the polymer.

Example 19

Into a 100 ml reactor equipped with a nitrogen purge, an agitator and a reflux condenser was added 15 grams of bis(1H,1H-heptafluorobutyl) fumarate. The reactor contents were heated to reflux with a jacket at 90° C. A monomer mixture of 42.4 grams 1H,1H-pentadecafluorooctyl acrylate, 42.2 grams of 1H,1H-heptafluorobutyl acrylate, 0.2 grams of acrylic acid and 0.5 grams of Vazo 67 was slowly added to the reactor over a period of 2 hours. After the reactor contents were allowed to react 3 hours, 33 grams of ethyl acetate was added to the reactor. The reactor contents were then cooled. The resulting polymer was a clear and viscous polymer that was soluble in ethyl acetate solvent.

Examples 20–22

Examples 20–22 were prepared substantially in accordance with the procedure of Example 1 with the exception that the monomer mixture was altered as indicated in Table 1 below. All values listed for the monomers are weight percentages, based on the total weight of the polymer. Also listed in Table 1 is the percent fluorine atom content for each of the polymers, based on the total weight of the polymer.

Examples 23

Into a 100 ml reactor equipped with a nitrogen purge, an agitator and a reflux condenser was added 15 grams of perfluorobutylethylene. The reactor contents were heated to reflux with a jacket at 90° C. A monomer mixture of 42.4 grams 1H,1H-pentadecafluorooctyl acrylate, 42.2 grams of 1H,1H-heptafluorobutyl acrylate, 0.2 grams of acrylic acid and 0.167 grams of Vazo 67 and 30 grams of ethyl acetate was slowly added to the reactor over a period of 2 hours. The reactor contents were allowed to react for 1 hour before a second portion of 1.0 grams of ethyl acetate and 0.1 grams of Vazo 67 initiator were added to the reactor. An additional 1.0 grams of ethyl acetate and 0.1 grams of Vazo 67 initiator were added to the reactor after the reactor contents were again permitted to react for 1 hour. After the addition of the third portion of initiator, the reactor contents were held for an additional hour, and then cooled. The percentage solids at the end of reaction was 76.8%.

Examples 24 and 25

Examples 24 and 25 were prepared substantially in accordance with the procedure of Example 23 with the exception that the monomer mixture was altered as indicated in Table 1 below. All values listed for the monomers are weight percentages, based on the total weight of the polymer. Also listed in Table 1 is the percent fluorine atom content for each of the polymers, based on the total weight of the polymer.

Examples 26–35

Examples 26–35 were prepared substantially in accordance with the procedure of Example 19 with the exception that the monomer mixture was altered and 0.05% n-dodecylmercaptan was added and no solvent was added for the radiation cure formulations, as indicated in Table 1 below. All values listed for the monomers are weight percentages, based on the total weight of the polymer. Also listed in Table 1 is the percent fluorine atom content for each of the polymers, based on the total weight of the polymer.

TABLE 1

| Example. | % F | PDFA | TFA | HFIPA | HDFA | HFBA | TA-N | TDFA | PFBE | HFBF | AA | Polymer Solution Appearance |
|---|---|---|---|---|---|---|---|---|---|---|---|---|
| 1 | 59.9 | 92 | 6 | — | — | — | — | — | — | — | 2 | slightly hazy |
| 2 | 58.9 | 88 | 10 | — | — | — | — | — | — | — | 2 | clear |
| 3 | 48.8 | — | 10 | 88 | — | — | — | — | — | — | 2 | clear |
| 4 | 49.7 | — | 10 | — | — | 88 | — | — | — | — | 2 | clear |
| 5 | 60.4 | 88 | — | — | — | 10 | — | — | — | — | 2 | clear |
| 6 | 58.5 | — | 10 | — | 88 | — | — | — | — | — | 2 | clear |
| 7 | 56.3 | 49 | — | — | — | 49 | — | — | — | — | 2 | clear |
| 8 | 58.3 | 68 | — | — | — | 30 | — | — | — | — | 2 | clear |
| 9 | 59.4 | 78 | — | — | — | 20 | — | — | — | — | 2 | — |
| 10 | 59.8 | 83 | — | — | — | 15 | — | — | — | — | 2 | clear |
| 11 | 60.9 | 93 | — | — | — | 5 | — | — | — | — | 2 | — |
| 12 | 53.6 | 23 | — | — | — | 75 | — | — | — | — | 2 | clear |
| 13 | 51.2 | — | — | — | — | 98 | — | — | — | — | 2 | clear |
| 14 | 55.2 | 48 | — | — | — | 48 | — | — | — | — | 4 | clear |
| 15 | 52.3 | — | — | — | — | 100 | — | — | — | — | — | clear |
| 16 | 57.5 | 50 | — | — | — | 50 | — | — | — | — | — | slightly hazy |
| 17 | 51.2 | — | — | — | — | 98 | — | — | — | — | 2 | — |
| 18 | 57.4 | 49.9 | — | — | — | 49.9 | — | — | — | — | 0.2 | slightly hazy |
| 19 | 55.4 | 42.2 | — | — | — | 42.2 | — | — | — | 15.0 | 0.2 | clear |
| 20 | 56.8 | — | — | — | — | 49.2 | 49.2 | — | — | — | 0.2 | slightly hazy |
| 21 | 54.6 | — | — | — | — | 49.2 | — | 49.2 | — | — | 0.2 | clear |
| 22 | 56.1 | — | — | — | 49.2 | 49.2 | — | — | — | — | 0.2 | clear |
| 23 | 58.7 | 42.2 | — | — | — | 42.2 | — | — | 15.0 | — | 0.2 | clear |
| 24 | 59.2 | — | — | — | — | 42.2 | 42.2 | — | 15.0 | — | 0.2 | clear |
| 25 | 59.0 | — | — | — | — | 39.9 | 39.9 | — | 20.0 | — | 0.2 | clear |
| 26 | 59.2 | 42.2 | — | — | — | 42.2 | — | — | — | 15.0 | 0.2 | NA |
| 27 | 59.9 | 42.2 | — | — | — | 42.2 | — | — | 15.0 | — | 0.2 | NA |
| 28 | 59.9 | 42.2 | — | — | — | 42.2 | — | — | 15.0 | — | 0.2 | NA |
| 29 | 59.9 | — | — | — | — | 42.2 | 42.2 | — | 15.0 | — | 0.2 | NA |
| 30 | 64.1 | — | — | — | — | 30.0 | 59.8 | — | 15.0 | — | 0.2 | NA |
| 31 | 64.1 | — | — | — | — | 30.0 | 59.9 | — | 15.0 | — | 0.2 | NA |
| 32 | 59.9 | 42.4 | — | — | — | 42.4 | — | — | 15.0 | — | 0.2 | NA |
| 33 | 59.9 | 42.4 | — | — | — | 42.4 | — | — | 15.0 | — | 0.2 | NA |

TABLE 1-continued

Monomers

| Example. | % F | PDFA | TFA | HFIPA | HDFA | HFBA | TA-N | TDFA | PFBE | HFBF | AA | Polymer Solution Appearance |
|---|---|---|---|---|---|---|---|---|---|---|---|---|
| 34 | 59.2 | — | — | — | — | 42.4 | 42.4 | — | 15.0 | — | 0.2 | NA |
| 35 | 64.1 | — | — | — | — | 30.0 | 59.8 | — | 15.0 | — | 0.2 | NA |

PDFA = 1H, 1H-pentadecafluorooctyl acrylate
TFA = 2,2,2-trifluoroethyl acrylate
HFIPA = hexafluoroisopropyl acrylate
HDFA = 1H, 1H, 2H, 2H-heptadecafluorodecyl acrylate
HFBA = 1H, 1H-heptafluorobutyl acrylate
TA-N = blend of 1H, 1H, 2H, 2H-fluoroalkyl acrylates
TDFA = 1H, 1H, 2H, 2H-tridecafluorooctyl acrylate
PFBE = perfluorobutylethylene
HFBF = bis(1H, 1H-heptafluorobutyl)fumarate
AA = acrylic acid
NA = no solvent Table 2 lists the refractive index, glass transition temperature (DSC and DMA method), surface energy and dynamic shear modulus of elasticity, G', of the various adhesive compositions. To measure the refractive index and the Tg (DSC), the polymer compositions of Examples 1–25 were coated onto a Mylar® polyester release film at a thickness of 25–31 g/m$^2$, and then dried at 70° C. for 15 minutes to remove the solvent, resulting in adhesive composition. The release liner was then removed and the refractive index of the adhesive was measured with an ABBE Mark II Refractometer at 25° C. The glass transition temperature, Tg, was measured using a TA Instruments DSC 2910 Differential Scanning Calorimeter.

To measure the surface energy and percent transmission, the polymer compositions of Examples 1–25 were coated onto a 2 mil Mylar® facestock film at a thickness of 25–31 g/m$^2$, and then dried at 70° C. for 15 minutes to remove the solvent, resulting in an adhesive composition. The percent light transmission was measured and recorded for the adhesive coated onto the Mylar® film using a BYK/Gardner hazegard plus. The percent light transmission of the Mylar® film itself was 91.7%. Also listed in Table 2 is the Dahlquist Contact Efficiency temperature, which is the temperature at which is G' is $3 \times 10^6$ dynes/cm$^2$.

To measure the Tg (DMA), G' and Dahlquist Contact Efficiency temperature, the polymers were placed in a small dish, at a thickness of approximately 3 mm and then oven dried for 1 hour at 70° C., then vacuum dried for 2 to 4 hours at 140° C. and 1 atmosphere vacuum. The thickness of the dried coating was 1 to 2 mm.

TABLE 2

| Example | Coat Wt. (g/m$^2$) | RI | Tg (° C.) DSC | Tg (° C.) DMA | G' (dynes/cm$^2$) | Dahlquist Contact ° C. | Surface Energy (dynes/cm) | % Transmittance |
|---|---|---|---|---|---|---|---|---|
| 5 | 26.6 | 1.356 | 14 | 25 | 8.0 × 10$^6$ | 24 | 7.6 | 92.7 |
| 5* | 29.6 | — | 14 | 33 | 2.0 × 10$^7$ | 29 | — | 94.0 |
| 7 | 28.0 | 1.362 | −3 | 6.5 | 2.0 × 10$^6$ | 14 | 4.1 | 93.7 |
| 7* | 26.4 | 1.361 | 1 | 9 | 3.0 × 10$^6$ | 20 | — | 92.4 |
| 8 | 25.0 | 1.359 | 1 | 13 | 1.3 × 10$^6$ | 14 | 4.2 | 93.1 |
| 9 | 26.0 | 1.357 | 7 | 13 | 1.5 × 10$^6$ | 14 | 3.9 | 93.9 |
| 10 | 28.0 | 1.357 | 10 | 22 | 2.0 × 10$^6$ | 18 | 5.5 | 94.2 |
| 11 | 28.8 | 1.356 | 21 | 30 | 3.3 × 10$^7$ | 30 | 9.6 | 94.2 |
| 12 | 26.0 | 1.366 | −1 | 1 | 1.6 × 10$^6$ | 14 | 5.1 | 94.0 |
| 13 | 25.8 | 1.370 | −1 | — | — | — | 4.1 | 93.7 |
| 13* | 31.2 | 1.370 | −4 | 6 | 3.0 × 10$^6$ | 20 | — | 93.9 |
| 14 | 30.6 | 1.365 | 7 | 20 | 1.0 × 10$^7$ | 30 | — | — |
| 15 | 27.2 | 1.367 | −9 | 13 | 7.0 × 10$^5$ | 7 | — | — |
| 16 | 25.4 | 1.356 | −9 | −4 | 4.0 × 10$^5$ | 0 | — | — |
| 18** | 25.7 | 1.358 | −8 | 1 | 4.0 × 10$^5$ | 3 | — | 93.5 |
| 19** | 26.1 | 1.357 | −2 | 8 | 6.2 × 10$^5$ | 9 | — | — |
| 20** | 25.9 | 1.358 | −5 | 1 | 3.5 × 10$^5$ | 2 | 12.9 | 92.0 |
| 21** | 25.0 | 1.362 | −8 | −0.5 | 5.3 × 10$^5$ | 5 | 9.5 | 93.2 |
| 22** | 25.3 | 1.359 | −5 | 0.5 | 4.2 × 10$^5$ | 4 | 9.2 | 93.1 |
| 23** | 28.2 | 1.358 | −7 | −1 | 4.0 × 10$^5$ | 2.5 | 8.7 | 93.1 |
| 24** | 31.3 | 1.358 | −5 | 0 | 3.8 × 10$^5$ | 3 | 11.0 | 91.8 |
| 25** | 25.4 | 1.359 | −4 | 1 | 4.0 × 10$^5$ | 5 | 11.1 | 92.5 |

*with 0.2% by weight AAA crosslinker
**with 0.1% by weight AAA crosslinker

The polymers of Examples 26–31 were formulated into a UV curable composition by combining the fluorinated polymer with a photoinitiator and other monomers as shown in Table 3. The UV curable compositions A–D were coated onto substrates and then UV cured by passing the coated samples 5 times at 50 ft/min under a Fusion Systems bulb at 850 millijoules/cm$^2$.

The UV curable compositions E and F were coated at thicknesses of 300 microns and 100 microns, respectively, onto a polymethyl methacrylate test panel, covered with a 1.5 mil Mylar® film and UV cured sandwiched between the two films. Coating E was cured by passing the sandwiched coating 15 times at 50 ft/min under a Fusion Systems bulb at 850 millijoules/cm$^2$. Coating F was cured by passing the sandwiched coating 10 times at 50 ft/min under a Fusion Systems bulb at 850 millijoules/cm$^2$.

The peel strength of several adhesives of the present invention are presented in Table 5 below. The polymers were first coated onto a Mylar® release liner and dried for 15 minutes at 70° C. The dried polymer film was then laminated with a 2 mil thick Mylar® facestock. The 90° peel adhesion data was obtained by die cutting the laminate construction into 25 mm×204 mm strips. The strips were then applied in the lengthwise direction to a 50 mm×152 mm test panel and rolled down using a 2 kilogram (4.5 lb.) 5.45 pli 65 shore "A" rubber-faced roller in the forward and reverse direction at a rate of 30 cm/min. The samples were conditioned for either 15 minutes or 24 hours in a controlled environment

TABLE 3

| UV curable coatings | A | B | C | D | E | F |
| --- | --- | --- | --- | --- | --- | --- |
| Polymer of Ex. 26 | 67% | — | — | — | — | — |
| Polymer of Ex. 27 | — | 40% | — | — | — | — |
| Polymer of Ex. 28 | — | — | 67% | — | — | — |
| Polymer of Ex. 29 | — | — | — | 67% | — | — |
| Polymer of Ex. 30 | — | — | — | — | 57.2% | — |
| Polymer of Ex. 31 | — | — | — | — | — | 57.2% |
| PDFA/HFBA 1:1 blend | 33% | 60% | 33% | 33% | 42.8% | 42.8% |
| Acrylic Acid | 0.2% | 0.2% | 0.2% | 0.2% | 0.2% | 0.2% |
| Photoinitiator* | 0.5% | 0.5% | 0.5% | 0.5% | 0.5% | 0.5% |
| Fluorinated HDDA** | 1.0% | 1.0% | 1.0% | 1.0% | 1.0% | 1.0% |
| Coat Wt. (g/m$^2$) | 27.0 | 27.4 | 28.3 | 28.9 | — | — |
| Thickness | — | — | — | — | 300μ | 100μ |
| RI | 1.358 | 1.359 | 1.359 | 1.36 | 1.36 | 1.36 |
| Tg (° C.) DSC | −2 | −5 | — | — | — | — |
| % Transmission | 92.2 | 92.0 | — | — | — | — |

*2-hydroxy-2-methyl-1-phenyl-propane-1-one
**2,2,3,3,4,4,5,5-octafluoro-1,6-hexyl diacrytate The polymers of Examples 32–35 were formulated into a gamma irradiation curable composition by combining the fluorinated polymer with a crosslinker and other monomers as follows in Table 4. The polymeric compositions were coated onto a substrate in a 100–150 micron thick coating and then gamma irradiated at 28.5–32.2 kGy, and at 55.5–62.9 kGy.

Examples 36–39

Examples 36–39 are mixtures of monomers, as listed below in Table 4, without any polymer added. The polymeric compositions were coated onto a substrate in a 100–150 micron thick coating and then gamma irradiated at 28.5–32.2 kGy, and at 55.5–62.9 kGy.

testing room maintained at 21° C. and 50% relative humidity. After conditioning, the test strips were peeled away from the test panel in an Instron Universal Tester according to a modified version of the standard tape method Pressure-Sensitive Tape Council, PSTI-1 (rev. 1992). Peel adhesion for single coated tapes 90° angle, where the peel angle was either 180° or 90°, i.e., perpendicular to the surface of the panel. All tests were run in triplicate.

The 50° C. 90° peel adhesion test was a modified test wherein the strips were rolled down onto the test panel and then placed in a 50° C. oven for 30 minutes. The samples were then removed from the oven and hand rolled down at a rate of 30 cm per minute, and conditioned for 1 hour. The strips were peeled away from the test panel in an Instron Universal Tester.

TABLE 4

| Gamma irradiation curable coatings | G | H | I | J | 36 | 37 | 38 | 39 |
| --- | --- | --- | --- | --- | --- | --- | --- | --- |
| Polymer of Ex. 32 | 40% | — | — | — | — | — | — | — |
| Polymer of Ex. 33 | — | 67% | — | — | — | — | — | — |
| Polymer of Ex. 34 | — | — | 67% | — | — | — | — | — |
| Polymer of Ex. 35 | — | — | — | 57% | — | — | — | — |
| TA-N | — | — | — | — | 49.9% | 49.9% | — | — |
| PDFA | — | — | — | — | — | — | 49.9% | 49.9% |
| HFBA | — | — | — | — | 49.9% | 49.9% | 49.9% | 49.9% |
| PDFA/HFBA 1:1 blend | 33% | 60% | 33% | 33% | — | — | — | — |
| Acrylic Acid | 0.2% | 0.2% | 0.2% | 0.2% | 0.2% | — | 0.2% | — |
| Stabilizer* | 100 ppm | 100 ppm | 100 ppm | 100 ppm | — | — | — | — |
| Fluorinated HDDA** | 0.5% | 0.5% | 0.5% | 0.5% | 0.5% | 0.5% | 0.5% | 0.5% |
| RI (28.5–32.2 kGy) | 1.3528 | 1.3546 | 1.3555 | 1.3540 | 1.3335 | 1.3285 | 1.3351 | 1.3363 |
| RI (55.5–62.9 kGy) | 1.3540 | 1.3553 | 1.3571 | 1.3554 | 1.3501 | 1.3501 | 1.3493 | 1.3500 |

*phenothiazine
**2,2,3,3,4,4,5,5-octafluoro-1,6-hexyl diacrytate

The shear data was obtained by die cutting the laminate construction into 12 mm×51 mm test strips. The test strips were applied to annealed, highly polished stainless steel test panels having typical dimensions of 50 mm×75 mm, making a sample overlap of 12 mm×12 mm with the test panel. The sample portion on the test panel was rolled down using a 2 kg, 5.45 pli 65 shore "A" rubber-faced roller in both the forward and reverse direction at a rate of 30 cm per minute. After a dwell time of 15 minutes under standard laboratory testing conditions, the test panels with the test stripes adhered thereto were placed at an angle 2° from the vertical, and a load of 500 g was attached to the end of the test strips. The time in minutes for the sample to fail cohesively was measured.

TABLE 6

|  | 0 kGy | 28.5–32.2 kGy | 55.5–62.9 kGy |
|---|---|---|---|
| Shear (¼ in², 500 g) | 1 min | 322 min. | 16 min. |
| Force (N) | 3.119 | 3.014 | 2.821 |
| Energy (Nmm) | 0.489 | 1.564 | 0.402 |
| Displacement (mm) | 2.417 | 1.483 | 0.427 |

While the invention has been explained in relation to its preferred embodiments, it is to be understood that various modifications thereof will become apparent to those skilled in the art upon reading the specification. Therefore, it is to be understood that the invention disclosed herein is intended

TABLE 5

| Example | Shear (min) | Initial 90° Peel Glass | 50° C. 90° Peel Glass | 90° Peel 24 hours Glass | 50° C. 90° Peel HDPE | 50° C. 90° Peel Teflon | 50° C. 90° Peel SS |
|---|---|---|---|---|---|---|---|
| 5 | — | 0.37 jp | 0.33 jp | — | 0.08 jp | 0.09 jp | 0.49 jp |
| 5* | — | 0.44 jp | 0.31 jp | — | 0.12 jp | 0.07 jp | 0.40 jp |
| 7 | 28.9 | 1.33 cl | 2.19 cl | 2.06 cl | 0.17 jp | 0.14 jp | 1.86 jp |
| 7* | 1681 | 1.11 cl | 2.03 cl | 1.29 cl | 0.11 jp | 0.07 jp | 1.37 cl |
| 8 | — | 0.71 jp | 1.70 jp | — | 0.10 jp | 0.10 jp | 1.58 jp |
| 9 | — | 0.64 jp | 0.48 jp | — | 0.09 jp | 0.08 jp | 1.66 jp |
| 10 | — | 0.45 jp | 0.43 jp | — | 0.10 jp | 0.08 jp | 0.49 jp |
| 11 | — | 0.02 cl | 0.05 jp | — | 0.02 jp | 0.02 jp | 0.06 jp |
| 12 | — | 1.16 cl | 1.50 cl | — | 0.19 jp | 0.05 jp | 1.06 cl |
| 13 | 30 | 1.50 cl | 1.22 cl | — | 0.10 jp | 0.06 jp | 1.49 cl |
| 13* | — | 1.29 cl | 1.87 cl | — | 0.14 jp | 0.07 jp | 1.66 cl |
| 14 | 382 | 0.64 jp | 0.46 jp/tr | 0.31 jp/tr | 0.05 jp | 0.03 jp | 0.51 jp/tr |
| 15 | 1 | 1.68 cl | 1.72 cl | 1.73 cl | 0.45 jp | 0.28 jp | 1.68 cl |
| 16 | 1 | 1.48 cl | 1.39 cl | 1.37 cl | 0.55 jp | 0.57 jp | 1.42 cl |
| 18** | 85 | 1.04 cl | 1.03 cl | 1.12 cl | 0.38 jp | 0.34 jp | 1.11 cl |
| 19** | 10 | 1.30 cl | — | 1.80 cl | 0.27 jp | 0.21 jp | 1.65 cl |
| 20** | 22 | 0.96 cl | — | 1.17 cl | 0.42 cl | 0.38 cl | 1.16 cl |
| 21** | 50 | 1.13 cl | — | 1.33 cl | 0.24 jp | 0.32 jp | 1.42 cl |
| 22** | 85 | 1.00 cl | — | 1.20 cl | 0.28 jp | 0.39 cl | 1.10 cl |
| 23** | 186 | 1.16 cl | — | 1.44 cl | 0.45 jp | 0.42 jp | 1.36 cl |
| 24** | 262 | 1.20 cl | — | 1.29 cl | 0.40 cl | 0.40 cl | 1.26 cl |
| 25*** | 18 | 1.13 cl | — | 1.25 cl | 0.38 jp | 0.36 cl | 1.20 cl |
| A (Ex. 26) | 6 | 1.28 jp | — | 1.60 sp | 1.25 jp/sp | 0.45 jp/sp | 1.79 sp |
| B (Ex. 27) | 5 | 1.6 jp/sp | — | 1.7 jp/sp | 0.77 m | 0.66 cl | 1.5 jp/sp |
| C (Ex. 28) | 1.3 | 2.0 sp | — | 2.2 sp | 0.9 jp/m | 0.6 jp/m | 2.0 sp |
| D (Ex. 29) | 10 | 0.3 sp | — | 0.5 jp/m | 0.2 jp/m | 0.1 jp/m | 0.5 jp/sp |

*with 0.2% by weight AAA crosslinker
**with 0.1% by weight AAA crosslinker
***with 0.05% by weight AAA crosslinker
"cl" indicated clean peel
"jp" indicates jerky peel
"tr" indicates that the adhesive was transferred to the test panel from the Mylar ® film
"sp" indicates that the adhesive split apart, leaving residue on the test panel and/or Mylar ® film Example 40

Example 40 was prepared substantially in accordance with the procedure of Example 23 with the exception that the monomer mixture was made up of 49.2 grams of 1H,1H-pentadecafluorooctyl acrylate, 49.2 grams of 1H,1H-heptafluorobutyl acrylate and 0.2 grams of acrylic acid. The solvent containing composition was devolatized, hot melt coated onto a Mylar® release film at a thickness of 100 microns and then over-laminated with a 7 mil Mylar® film. The coating was then subjected to gamma irradiation. Table 6 below shows the results of an AAT adhesion test. The AAT adhesion test is described in "Adhesives Age", vol. 10, no. 10 (September 1997), pages 18–23.

to cover such modifications as fall within the scope of the appended claims.

What is claimed is:

1. An optical adhesive having a refractive index of less than 1.40 comprising a transparent polymer comprising:
   75–100% by weight, based on the total weight of the polymer of at least one fluorosubstituted monoacrylate comonomer of the formula:

(I)

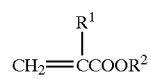

wherein $R^1$ is hydrogen and $R^2$ is a linear or branched fluoroalkyl group having 2 to 14 carbon atoms, wherein the at least one fluorosubstituted monoacrylate comprises hexafluoroisopropyl acrylate; and 0–5% by weight, based on the total weight of the polymer of an ethylenically unsaturated comonomer selected from the group consisting of (a) mono- and di-carboxylic acids, (b) hydroxyalkyl monomers, (c) epoxy monomers, (d) carboxylic amides, and (e) N-vinyl lactam monomers.

2. The optical adhesive of claim 1 wherein the adhesive has a refractive index of less than 1.36.

3. The optical adhesive of claim 1 wherein the at least one fluorosubstituted monoacrylate further comprises at least one comonomer is selected from the group consisting of 1H,1H-heptafluorobutyl acrylate, 1H, 1H-pentadecafluorooctyl acrylate, trifluoroethyl acrylate and 1H,1H,2H,2H-heptadecafluorodecyl and mixtures thereof.

4. The optical adhesive of claim 1 wherein the fluorosubstituted monoacrylate further comprises 1H, 1H-pentadecafluorooctyl acrylate.

5. The optical adhesive of claim 1 wherein the ethylenically unsaturated monomer comprises a mono- or di-carboxylic acid.

6. The optical adhesive of claim 5 wherein the ethylenically unsaturated monomer comprises acrylic acid.

7. The optical adhesive of claim 1 wherein the glass transition temperature (Tg) of the transparent polymer is less than 15° C., as measured by differential scanning calorimetry.

8. The optical adhesive of claim 1 further comprising up to 25% by weight, based on the total weight of the polymer of a fluorosubstituted alpha,beta-ethylenically unsaturated dicarboxylic acid ester or fluoroalkyl ethylene.

9. The optical adhesive of claim 1 further comprising a non-fluorosubstituted monoacrylate having a Tg of or below 10° C.

10. The optical adhesive of claim 1 wherein the adhesive is a pressure-sensitive adhesive.

11. The optical adhesive of claim 1 further comprising an amorphous fluoropolymer.

12. A transfer tape comprising an optical pressure-sensitive adhesive layer and a carrier layer, wherein the optical pressure-sensitive adhesive has a refractive index of less than 1.40 and comprises a transparent polymer comprising: 75–100% by weight, based on the total weight of the polymer of at least one fluorosubstituted monoacrylate comonomer of the formula:

wherein $R^1$ is hydrogen and $R^2$ is a linear or branched fluoroalkyl group having 2 to 14 carbon atoms, wherein the at least one fluorosubstituted monoacrylate comprises hexafluoroisopropyl acrylate; and 0–5% by weight, based on the total weight of the polymer of an ethylenically unsaturated comonomer selected from the group consisting of(a) mono- and di-carboxylic acids, (b) hydroxylalkyl monomers, (c) epoxy monomers, (d) carboxylic amides, and (e) N-vinyl lactam monomers.

13. The transfer tape of claim 12 wherein the adhesive has a refractive index of less than 1.36.

14. The transfer tape of claim 12 wherein the at least one fluorosubstituted monoacrylate further comprises at least one comonomer is selected from the group consisting of 1H,1H-heptafluorobutyl acrylate, 1H, 1H-pentadecafluorooctyl acrylate, trifluoroethyl acrylate and 1H,1H,2H,2H-heptadecafluorodecyl acrylate, and mixtures thereof.

15. The transfer tape of claim 12 wherein the fluorosubstituted monoacrylate further comprises 1H,1H-pentadecafluorooctyl acrylate.

16. The transfer tape of claim 12 wherein the ethylenically unsaturated monomer comprises a mono- or di-carboxylic acid.

17. The transfer tape of claim 16 wherein the ethylenically unsaturated monomer comprises acrylic acid.

18. The transfer tape of claim 12 wherein the optical adhesive further comprises up to 25% by weight based on the total weight of the polymer of a fluorosubstituted alpha, beta-ethylenically unsaturated dicarboxylic acid ester or fluoroalkyl ethylene.

19. The transfer tape of claim 12 wherein the optical adhesive further comprises a non-fluorosubstituted monoacrylate having a Tg of or below 10° C.

20. The transfer tape of claim 12 wherein the optical adhesive is a pressure-sensitive adhesive.

21. An optical adhesive having a refractive index of less than 1.40 comprising a transparent polymer comprising:

75–100% by weight, based on the total weight of the polymer of at least one fluorosubstituted monoacrylate comonomer of the formula:

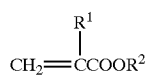

wherein $R^1$ is hydrogen and $R^2$ a linear or branched fluoroalkyl group having 2 to 14 carbon atoms;

up to about 5% by weight, based on the total weight of the polymer of one or more ethylenically unsaturated comonomer selected from the group consisting of (a) mono- and di-carboxylic acids, (b) hydroxyalkyl monomers, (c) epoxy monomers, (d) carboxylic amides, and (e) N-vinyl lactam monomers; and one or more chemical crosslinking agent.

22. The optical adhesive of claim 21, wherein the chemical crosslinlkdng agent comprises aluminum acetoacetonate.

23. An optical adhesive having a refractive index of less than 1.40 comprising a crosslinked transparent polymer comprising:

75–100% by weight, based on the total weight of the polymer of at least one fluorosubstituted monoacrylate comonomer of the formula:

wherein $R^1$ is hydrogen and $R^2$ is a linear or branched fluoroalkyl group having 2 to 14 carbon atoms; and up to about 5% by weight, based on the total weight of the polymer of an ethylenically unsaturated comonomer selected from the group consisting of (a) mono- and di-carboxylic acids, (b) hydroxyalkyl monomers, (c) epoxy monomers, (d) carboxylic amides, and (e) N-vinyl lactam monomers.

24. The optical adhesive of claim 23, wherein the crosslinking is obtained by one or more of actinic radiation or addition of a chemical crosslinking agent.

25. An optical adhesive having a refractive index of less than 1.40 comprising a transparent copolymer comprising:

75–100% by weight, based on the total weight of the copolymer of at least one fluorosubstituted monoacrylate comonomer of the formula:

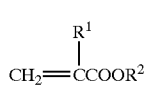

wherein $R^1$ is hydrogen and $R^2$ is a linear or branched fluoroalkyl group having 2 to 14 carbon atoms;

0–5% by weight, based on the total weight of the copolymer of an ethylenically unsaturated comonomer selected from the group consisting of (a) mono- and di-carboxylic acids, (b) hydroxyalkyl monomers, (c) epoxy monomers, (d) carboxylic amides, and (e) N-vinyl lactam monomers; and one or more perfluoroalkyl ethylene.

26. A transfer tape comprising an optical pressure-sensitive adhesive layer and a carrier layer, wherein the optical pressure-sensitive adhesive has a refractive index of less than 1.40 and comprises a transparent polymer comprising:

75–100% by weight, based on the total weight of the polymer of at least one fluorosubstituted monoacrylate comonomer of the formula:

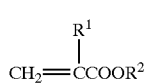

wherein $R^1$ is hydrogen and $R^2$ is a linear or branched fluoroalkyl group having 2 to 14 carbon atoms;

up to about 5% by weight, based on the total weight of the polymer of an ethylenically unsaturated comonomer selected from the group consisting of (a) mono- and di-carboxylic acids, (b) hydroxylalkyl monomers, (c) epoxy monomers, (d) carboxylic amides, and (e) N-vinyl lactam monomers; and one or more chemical crosslinking agent.

27. The transfer tape of claim 26, wherein the chemical crosslinking agent comprises aluminum acetoacetonate.

28. A transfer tape comprising an optical pressure-sensitive adhesive layer and a carrier layer, wherein the optical pressure-sensitive adhesive has a refractive index of less than 1.40 and comprises a crosslinked transparent polymer comprising:

75–100% by weight based on the total weight of the polymer of at least one fluorosubstituted monoacrylate comonomer of the formula:

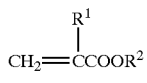

wherein $R^1$ is hydrogen and $R^2$ a linear or branched fluoroalkyl group having 2 to 14 carbon atoms; and up to about 5% by weight, based on the total weight of the polymer of an ethylenically unsaturated comonomer selected from the group consisting of (a) mono- and di-carboxylic acids, (b) hydroxylailcyl monomers, (c) epoxy monomers, (d) carboxylic amides, and (e) N-vinyl lactam monomers.

29. The transfer tape of claim 28, wherein the crosslinking is obtained by one or more of actinic radiation or addition of a chemical crosslinking agent.

30. A transfer tape comprising an optical pressure-sensitive adhesive layer and a carrier layer, wherein the optical pressure-sensitive adhesive has a refractive index of less than 1.40 and comprises a transparent polymer comprising:

75–100% by weight, based on the total weight of the polymer of at least one fluorosubstituted monoacrylate comonomer of the formula:

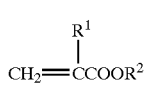

wherein $R^1$ is hydrogen and $R^2$ a linear or branched fluoroalkyl group having 2 to 14 carbon atoms;

0–5% by weight, based on the total weight of the polymer of an ethylenically unsaturated comonomer selected from the group consisting of (a) mono- and di-carboxylic acids, (b) hydroxylalkyl monomers, (c) epoxy monomers, (d) carboxylic amides, and (e) N-vinyl lactam monomers; and one or more perfluoroalkyl ethylene.

* * * * *